United States Patent [19]

Ach et al.

[11] Patent Number: 4,989,721

[45] Date of Patent: Feb. 5, 1991

[54] PALLET TRANSFER CORNER SYSTEM

[75] Inventors: William D. Ach, Brooklyn Park; Edmund J. Anderson, Minneapolis; Lynn B. Behrends, Delano; Wayne P. Desrude, Brooklyn Park; Gene J. Klos, Minnetonka, all of Minn.

[73] Assignee: Honeywell Inc., Minneapolis, Minn.

[21] Appl. No.: 204,103

[22] Filed: Jun. 8, 1988

[51] Int. Cl.$^5$ .................................. B65G 29/00
[52] U.S. Cl. ........................ 198/465.1; 198/465.2
[58] Field of Search ............ 198/803.16, 465.2, 465.1, 198/803.01

[56] References Cited

U.S. PATENT DOCUMENTS

| | | | |
|---|---|---|---|
| 3,384,097 | 5/1968 | Meeker et al. | 198/465.2 X |
| 3,578,148 | 5/1971 | Pinckard | 198/803.01 |
| 3,646,656 | 3/1972 | Zilahy et al. | 29/790 |
| 4,118,855 | 10/1978 | Lequeux | 29/447 |
| 4,200,183 | 4/1980 | Riggs | 198/803.01 |
| 4,217,978 | 8/1980 | Stalker | 198/345 |
| 4,255,077 | 3/1981 | Smith | 414/786 |
| 4,257,513 | 3/1981 | Siarto | 198/345 |
| 4,360,097 | 11/1982 | Brems | 198/345 |
| 4,474,286 | 10/1984 | Alexander | 198/803.01 X |
| 4,479,572 | 10/1984 | Merz | 198/465.1 X |
| 4,625,857 | 12/1986 | Kuehl | 198/465.1 |

FOREIGN PATENT DOCUMENTS

1229146  5/1986  U.S.S.R. ................ 198/803.16

Primary Examiner—Joseph E. Valenza
Assistant Examiner—Cheryl L. Gastineau

[57] ABSTRACT

Disclosed is a pallet transfer corner system comprising a transfer mechanism having a corner portion with a moving surface and a transfer system for transferring pallets of different lengths around the corner portion of the transfer mechanism while maintaining the original orientation of the pallets with respect to the direction of pallet travel.

9 Claims, 8 Drawing Sheets

PALLET TRANSFER CORNER SYSTEM

TECHNICAL FIELD OF THE INVENTION

The present invention relates generally to the field of pallet transfer and more specifically to a system and method for handling pallets of different lengths in a corner portion of a pallet transfer system. Such pallets may be employed as holding means for devices being constructed along an assembly line type of operation. The present invention permits pallets of different lengths to move around a corner portion of a pallet transfer system while maintaining the original orientation of the pallets with respect to the direction of pallet transfer. The present invention is compatible with and preferably is implemented such that the pallets are permitted to accumulate in the corner portion of the transfer system.

BACKGROUND OF THE INVENTION

There has long been a reed to have a simple and reliable corner portion of a pallet transfer system which would transfer pallets of different lengths around the corner portion of the transfer mechanism while maintaining the original orientation of the pallets with respect to the direction of pallet travel. The present invention solves this need and may be implemented in a manner permitting accumulation of the pallets in the corner portion of the system.

SUMMARY OF THE INVENTION

The present invention is a pallet transfer corner system comprising a transfer mechanism having a corner portion with a moving surface and transfer means for transferring pallets of different lengths around the corner portion of the transfer mechanism while maintaining the original orientation of the pallets with respect to the direction of pallet travel.

DETAILED DESCRIPTION OF THE PREFERRED EMBODIMENTS

The drawings of the present application illustrate pallets having various detailed features which are not labelled or discussed and which do not directly relate to the present invention. Thus, inclusion of these details, which relate to other preferred features of the present system, are intended to in no way limit the present invention. The function of some of these details may be ascertained by reference to three co-pending applications which were filed on Apr. 8, 1988 and which are assigned to the same assignee as the present application.

"A System for Removing A Pallet From a Moving Transfer Mechanism and for Accurately Locking the Pallet at a Precise Location", by Edmund J. Anderson and Wayne P. Desrude, Ser. No. 179,586, filed Apr. 8, 1988, now U.S. Pat. No. 4,928,806.

"A Compound Triangular Cross Section Pallet Positioning System", by Edmund J. Anderson and Wayne P. Desrude, Ser. No. 179,475, filed Apr. 8, 1988, now abandoned.

"A Pallet Having a Sidewall Comprising an Arcuate Surface", by Edmund J. Anderson, Wayne P. Desrude, Gene J. Klos, and William D. Ach, Ser. No. 179,417, filed Apr. 8, 1988, now abandoned.

These patents are incorporated by reference in the present application as if fully set forth herein.

Figure 1:
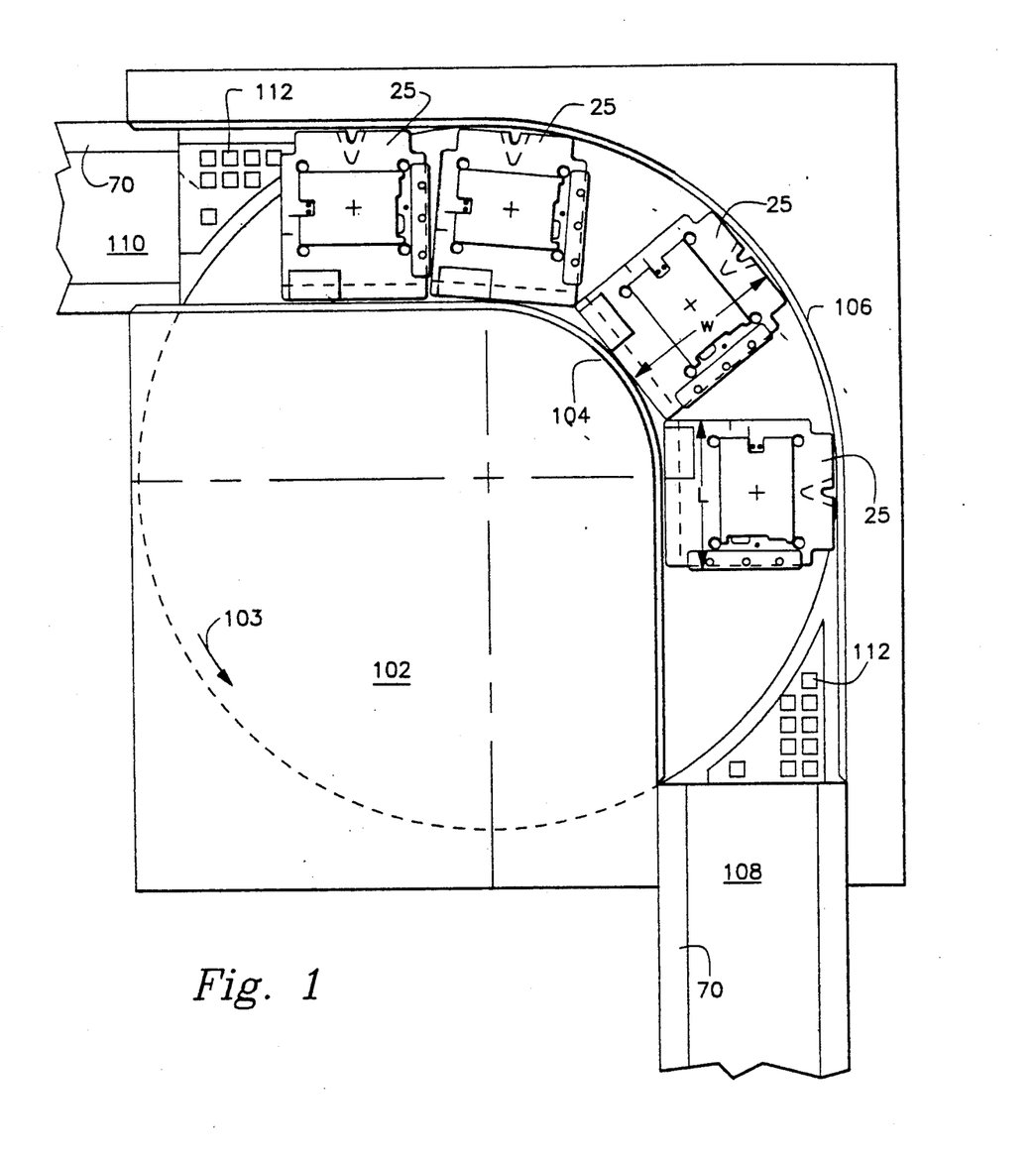
FIG. 1 illustrates a transfer system having a corner portion for transferring pallets of uniform length around the corner portion.

FIG. 1 illustrates pallets 25 of substantially uniform length and width being transferred around a corner portion of a pallet transfer system. The system shown includes a rotating, circular shaped turntable 102, a curved inner guide rail 104, and a curved outer guide rail 106.

FIG. 1 also illustrates a transfer mechanism input portion 108 and a transfer mechanism output portion 110, these transfer portions being shown comprising a split moving belt 70 and passive rollers 112; guide rails (not shown) would also preferably be used on either side of input and output portions 108 and 110.

As previously indicated, the present invention is a pallet transfer system comprising a pallet transfer mechanism having a corner portion with a moving surface and transfer means for transferring pallets of different lengths around the corner portion of the transfer mechanism while maintaining the original orientation of the pallets with respect to the direction of pallet travel. Several approaches to implementing the present invention have been recognized and are discussed in the present application.

In pallet transfer systems comprising pallets of different lengths, it will frequently be advantageous to maintain a nominal pallet width W to be substantially the same for each pallet. Accordingly, the transfer means of the present invention preferably includes a small pallet having a nominal width W and a nominal length L and a large pallet having a nominal width which is substantially the same as W and a nominal length which is longer than L. For some systems, it is advantageous to have the length of the large pallet be substantially an integer multiple of L in order, for example, to know that work pieces carried by multiple pallets are located an integer multiple distance of a shorter lengthed pallet with respect to a predetermined reference point in the system.

The transfer means of the present invention preferably comprises guide rail means having an outer guide rail 106 and an opposing inner guide rail 104 separated by a distance for permitting the pallets of different lengths to maneuver around the corner portion without jamming. Typically, the inner guide rail and the outer guide rail each comprise a curved surface.

As is illustrated in the Figures, the moving surface of the present transfer mechanism preferably comprises a rotating, circular-shaped turntable 102, a direction of rotation being illustrated by way of example in the Figures with arrow 103.

The transfer means of the present invention may be implemented through guide rail means having an outer guide rail and an opposing inner guide rail separated by a distance together with pallets having a configuration for cooperating with the guide rail means in order to permit pallets of different lengths to maneuver around the corner portion without jamming.

In one preferred embodiment of the present invention, the transfer means comprises a large pallet having a length longer than L, the large pallet also having arcuate surface means for cooperation with the guide rail means, the arcuate surface means comprising an arcuate surface forming a substantial portion of the large pallet sidewall. This approach can be implemented with the arcuate surface being configured to cooperate with an inner guide rail such as 104, examples of such arcuate pallet sidewall surfaces being surface 100 in FIG. 2 (which illustrates large pallets having a pallet length of 2L) and arcuate surface 112 shown in FIG. 3 (which illustrates pallets 25b having a length 3L). Note that, in each of these embodiments in which the arcuate sidewall surface of the large pallet is configured to cooperate with the inner guide rail, arcuate surfaces 100 and 112 respectively form only a portion of the inner pallet sidewall, which preferably also comprises a substantially straight edge 100a and 112a, respectively.

Figure 4:
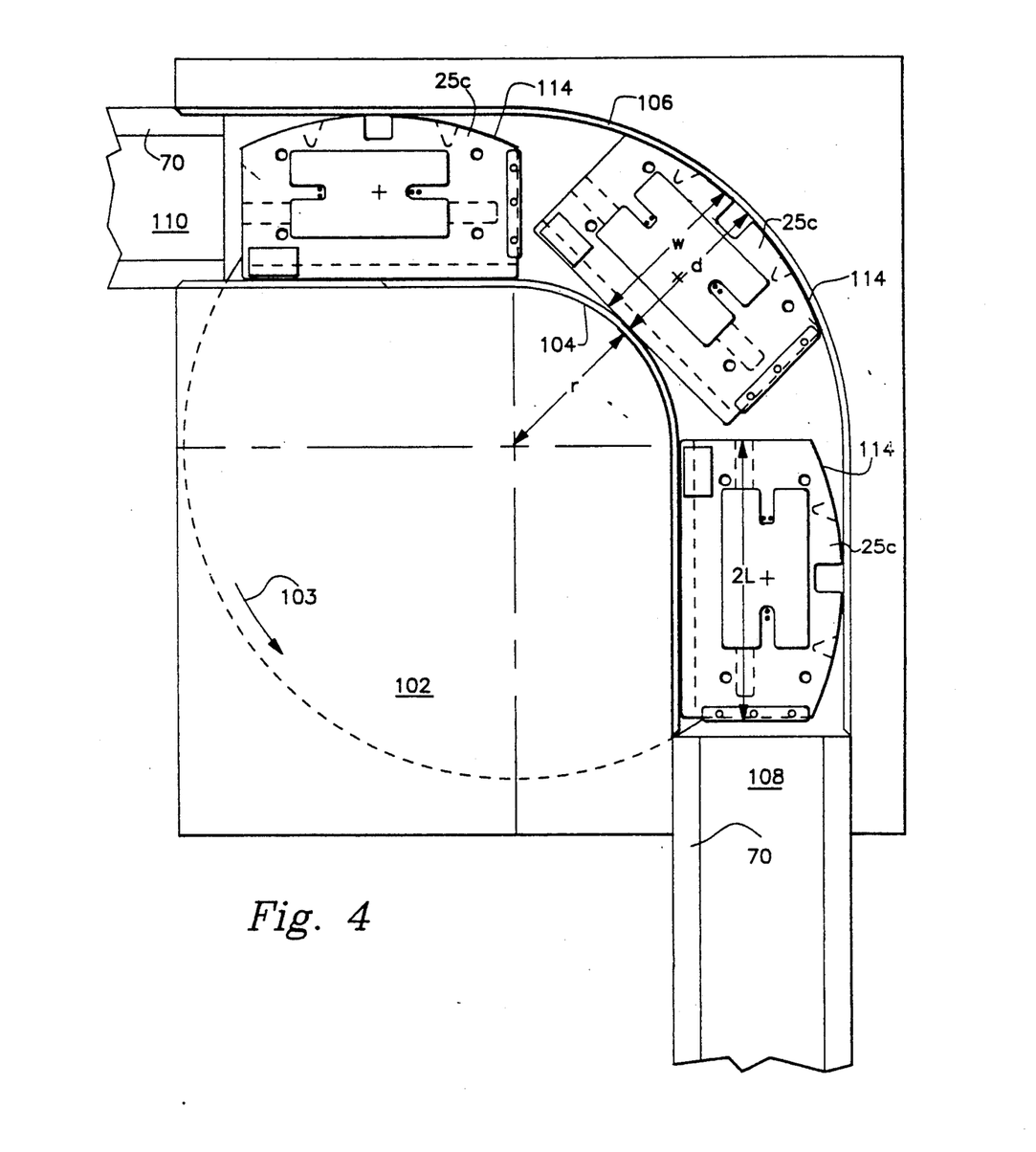
FIG. 4 illustrates an embodiment of the present invention in which the transfer means comprises large pallets having arcuate surface means for cooperating with a guide rail, the arcuate surface means comprising an arcuate surface forming a large pallet sidewall configured to cooperate with an outer guide rail.

In an alternate embodiment illustrated in FIG. 4, arcuate surface 114 is configured to cooperate with outer guide rail 106. In the embodiment shown, outside arcuate pallet surface 114 forms an entire edge of pallet 25c, which is illustrated having a length 2L.

Figure 2:
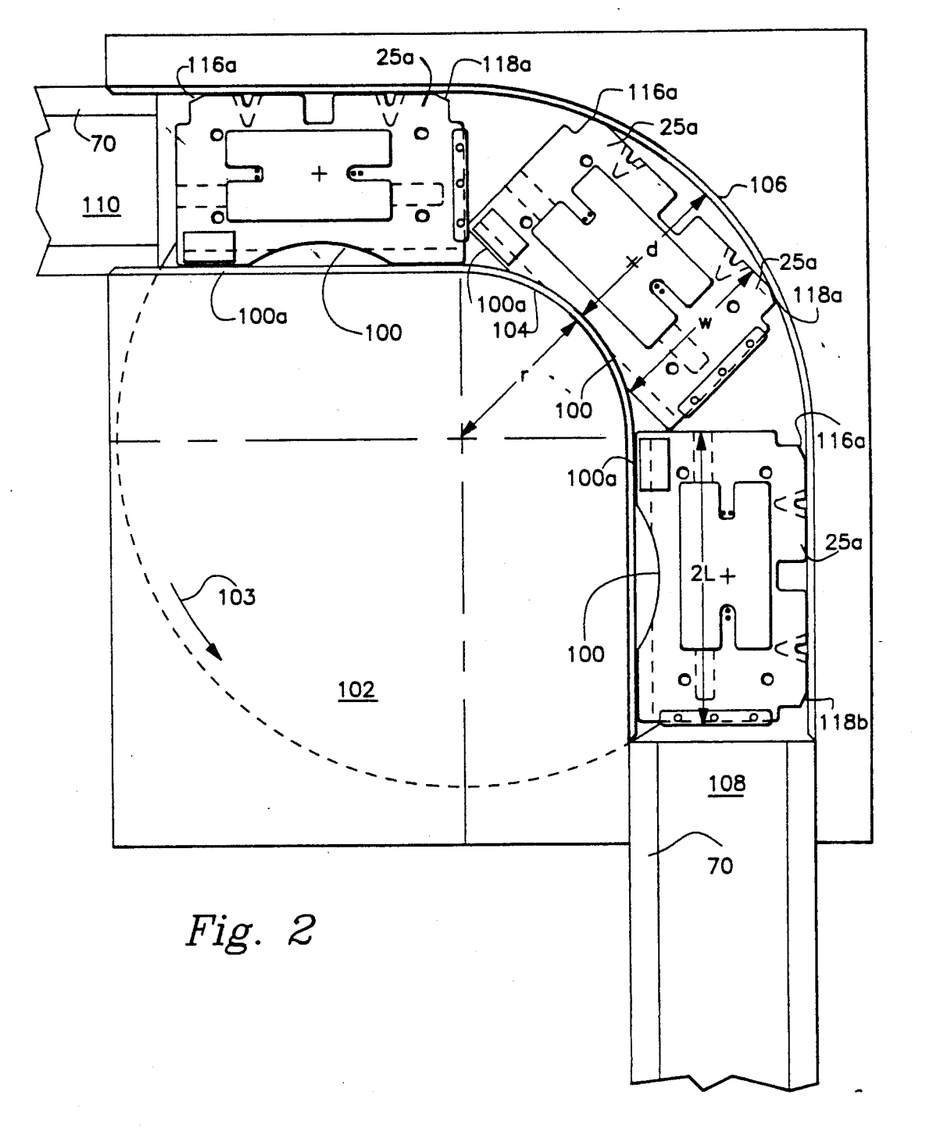
FIG. 2 illustrates an embodiment of the present invention in which the transfer means comprises large pallets having both arcuate surface means and truncated corners for cooperating with guide rails to transfer the longer lengthed pallets around the corner portion of the transfer mechanism.
Figure 3:
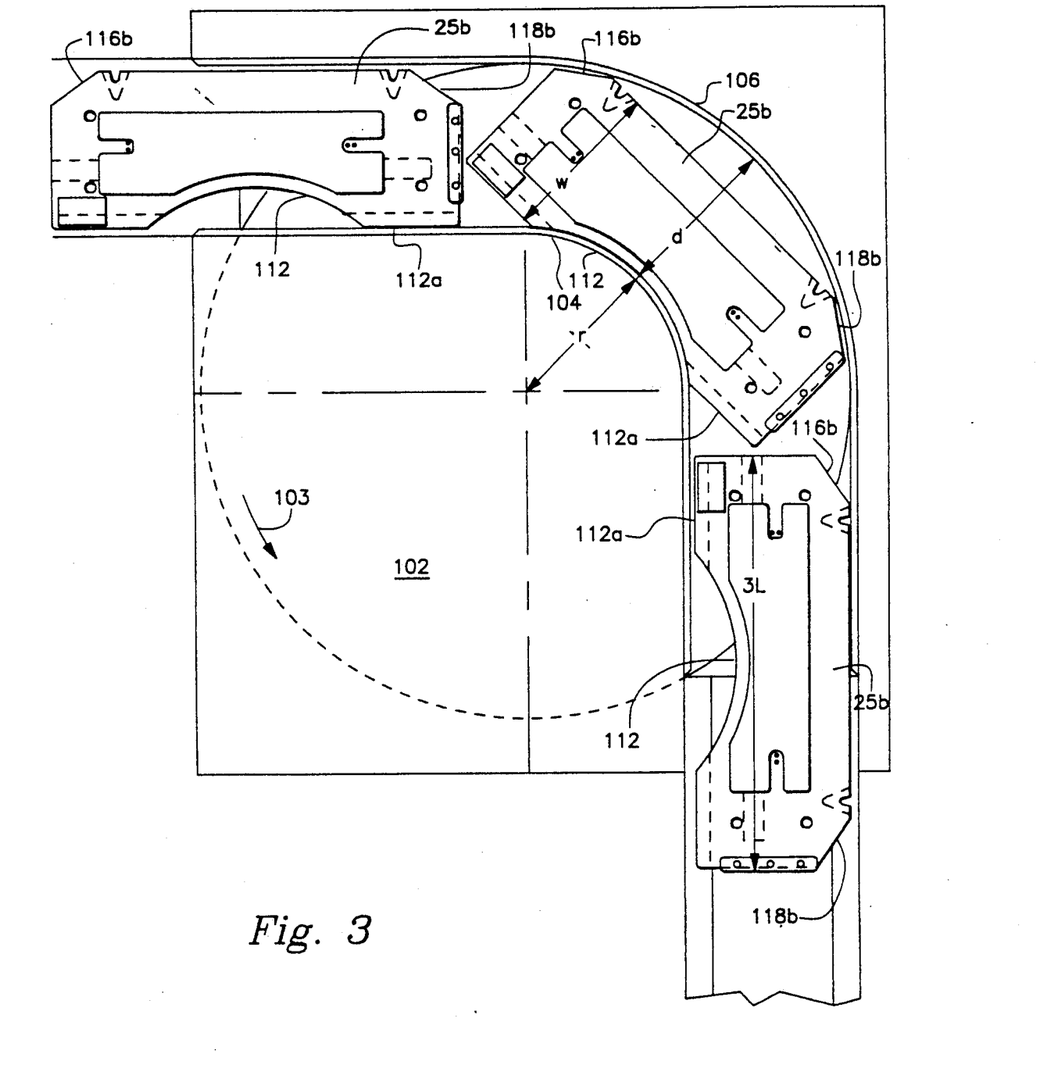
FIG. 3 shows even longer pallets than those shown in FIGS. 1 and 2, with the transfer means of the present invention comprising, as in FIG. 2, arcuate surface means and truncated corners for cooperating with guide rails to transfer the longer lengthed pallets around the corner portion of the transfer mechanism.
Figure 5:
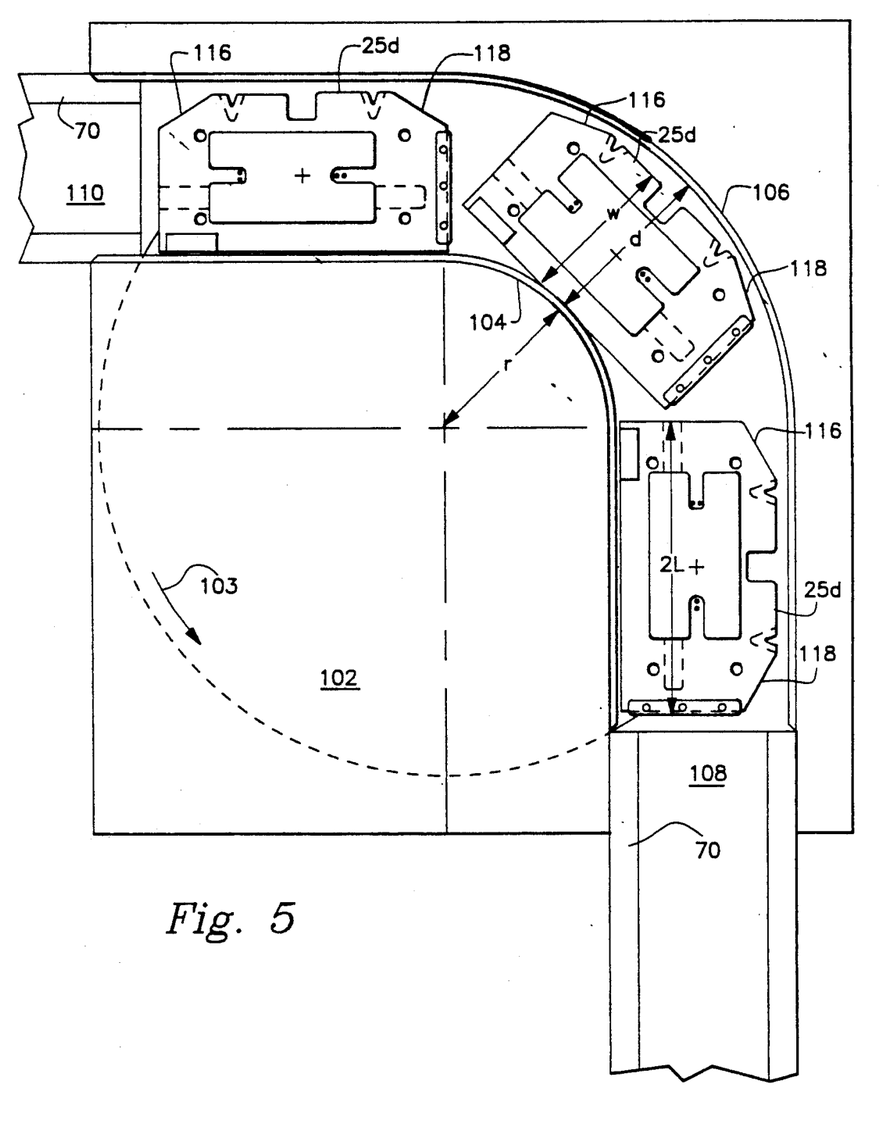
FIG. 5 illustrates an embodiment of the present invention in which the transfer means comprises large pallets having first and second truncated corners for cooperating with an outer guide rail by reducing the turning radius of the large pallets.

Another embodiment for implementing the present invention is to configure the larger sized pallets so that they comprise first and second truncated or shortened corners such as truncated corners 116 and 118 of pallet 25d illustrated in FIG. 5, the truncated or shortened corners being configured for the purpose of cooperating with an outer guide rail such as 106 by reducing the turning radius of the large pallet. Truncated or shortened corners used with the present invention can be of virtually any configuration, including straight truncated edges such as shown (curved truncated edges also being acceptable). These truncated corners formed for cooperating with an outer guide rail by reducing the turning radius of a pallet can be used without an arcuate pallet sidewall surface on the opposite side of the pallet (as is illustrated in FIG. 5) or in combination with an arcuate surface formed on the inner sidewall surface of the pallet for also cooperating with an inner guide rail such as 104. The latter combination is illustrated in FIG. 2, where truncated corners 116a and 118a are shown configured as part of pallet 25a for cooperating with outer guide rail 106, with pallet 25a further comprising arcuate surface 100 for cooperating with inner guide rail 104. FIG. 3 also illustrates such a combination, with truncated corners 116b and 118b of pallet 25b being configured for cooperation with outer guide rail 106 and with the opposite pallet sidewall comprising arcuate surface 112 for cooperating with inner guide rail 104.

In another embodiment for implementing the present invention, the transfer means comprises a removable corner fairing 120 (FIG. 7) for selectively varying the distance between the inner and the outer guide rails from a faired position to a non-faired position The non-faired position (FIG. 6) increases the distance between the inner and outer guide rails and permits pallets normally requiring a turning radius greater than is available in the faired position (FIG. 7) to maneuver around the corner portion of the transfer mechanism without jamming. FIG. 7 illustrates movable fairing 120 mounted on inner guide rail 104a.

When implemented as illustrated in the Figures, when in the faired position (FIG. 7), a distance d between an apex 122 of fairing 120 and an apex 124 of outer guide rail 106 is substantially the same as the uniform distance d between guide rails 104 and 106 (See FIGS. 2-5). In the non-faired position (FIG. 6), the preferred spacing between the inner and outer guide rails at the apex of the guide rail curvatures is increased to a distance d'. This is accomplished in the embodiment illustrated in FIG. 6 by using, at an apex 126 of inner guide rail 104a, a radius r' which is smaller than a radius r used for inner guide rail 104; in the embodiment shown, smaller radius r' is then blended with the remainder of inner guide rail 104a by using substantially straight blending rails 128.

Figure 6:
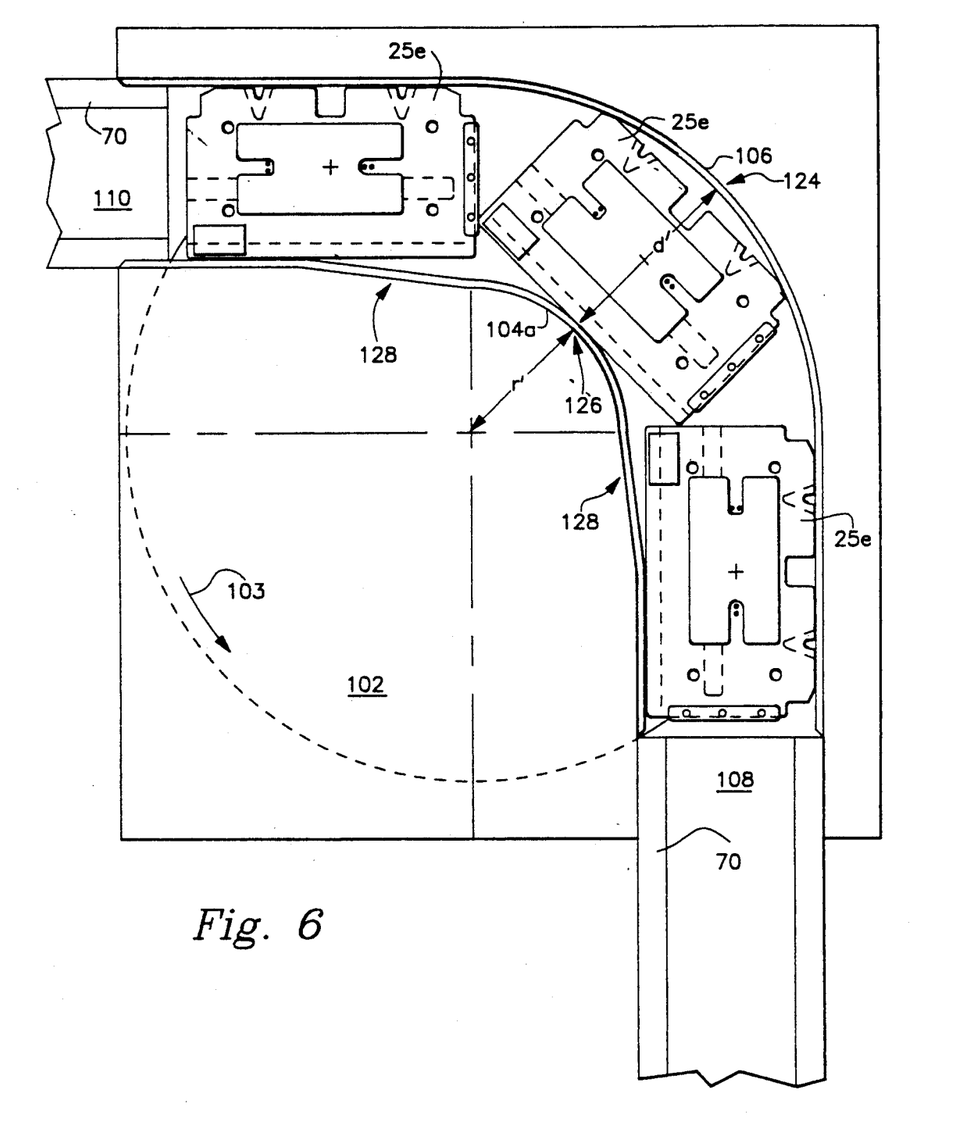
FIGS. 6 and 7 illustrate a further preferred embodiment of the present invention wherein the transfer means comprises a movable corner fairing for selectively varying the distance between inner and outer guide rails from a faired position to a non-faired position, the non-faired position increasing the distance between the inner and outer guide rails and permitting pallets normally requiring a turning radius greater than available in the faired position to maneuver around the corner portion of the transfer mechanism without jamming.
Figure 7:
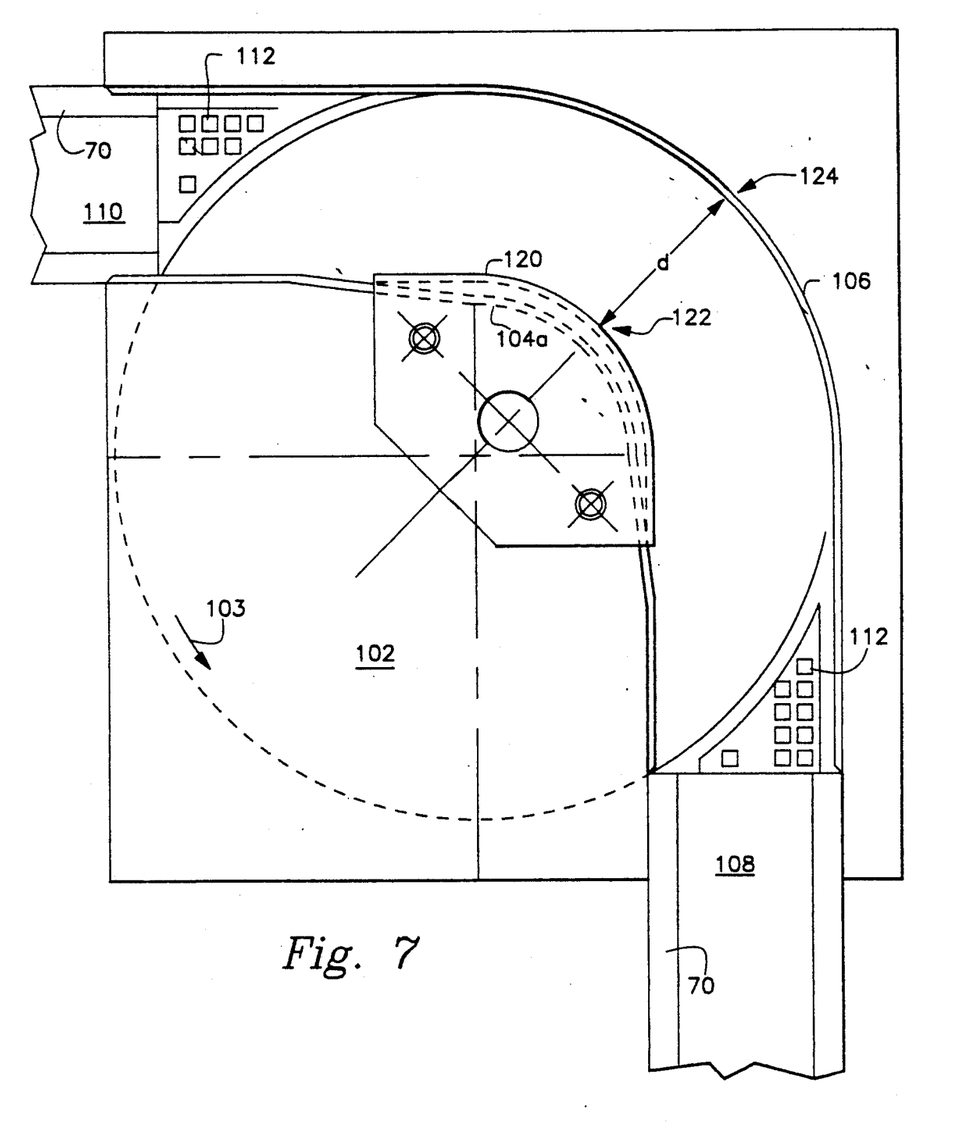
Figure 8:
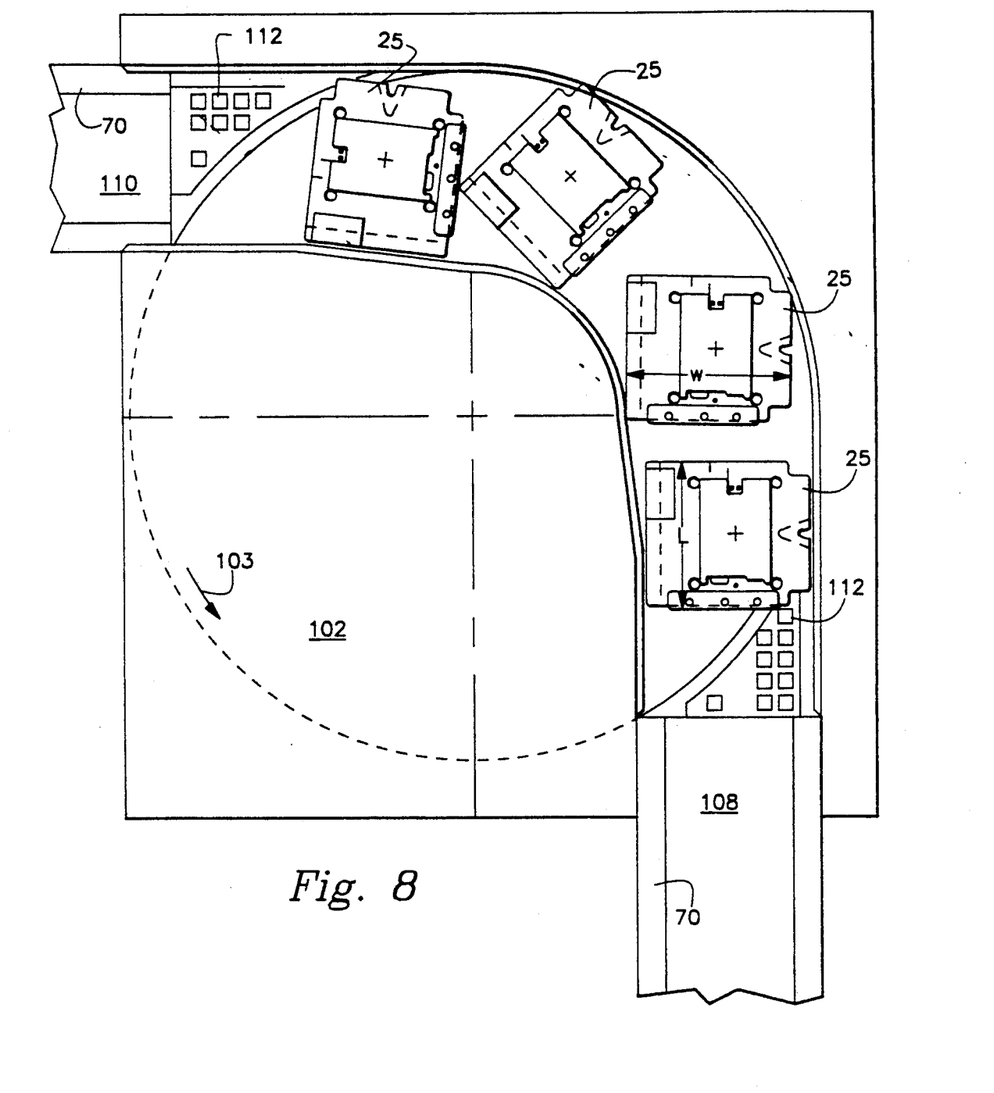
FIG. 8 illustrates that, while the non-faired position of the embodiment shown is useful for transferring longer lengthed pallets around the corner portion of this embodiment (as is illustrated in FIG. 6), shorter lengthed pallets of substantially the same width as the longer lengthed pallets can jam in the non-faired position.

As can be seen in FIG. 6, when this embodiment is in the non-faired position, increased distance d' between the inner guide rail 104a and outer guide rail 106 permits longer lengthed pallets 25e to maneuver around the corner portion of a transfer mechanism without jamming. On the other hand, if one attempts transferring longer lengthed pallets such as 25e around the corner portion illustrated in FIG. 1 (which easily accommodates shorter lengthed pallets 25), pallets 25e will jam and will not pass around the corner portion. In contrast, as is illustrated in FIG. 8, if one attempts to transfer shorter lengthed pallets 25 around the non-faired position of this embodiment, the shorter lengthed pallets will likely jam.

Accordingly, this embodiment of the present invention may be implemented by having movable fairing 120 in place (FIG. 7) when shorter lengthed pallets are being transferred around the transfer mechanism (so that the shorter lengthed pallets transfer around the corner portion equally as well as they do in FIG. 1) and in the non-faired position (FIG. 6) when longer lengthed pallets such as those illustrated are being transferred around the corner portion.

Note that longer lengthed pallets 25e pass around the non-faired corner portion shown in FIG. 6 even without arcuate surfaces, truncated corners, or other special configurations being configured into the pallets. Alternately, note also that, in the faired position of this embodiment as illustrated in FIG. 7, pallets having arcuate surfaces and/or truncated corner portions as previously described (and as illustrated in FIGS. 2-5) can be passed around the faired position of the corner system shown in FIG. 7. Accordingly, when the guide rail means of the present system is implemented with a corner fairing such as 120, longer lengthed pallets may be transferred around the corner portion with the movable fairing in the faired position and with the longer lengthed pallets comprising arcuate surfaces and/or truncated corners as previously described and as previously illustrated in FIGS. 2-5.

The present invention may be described as a method for transferring pallets of different lengths around the corner portion of a pallet transfer system without jamming while maintaining the original orientation of the pallets with respect to the direction of pallet travel Such a method comprises the step of placing pallets of different lengths having approximately equal widths on a moving transfer mechanism, and moving the pallets of different lengths toward the corner portion of the pallet transfer system. One preferred method comprises guiding the pallets of different lengths through the corner portion of the pallet transfer system by use of inner and outer curved guide rails and by using pallet configurations which cooperate with the inner and outer curved guide rails in order to prevent the pallets from substantially misaligning with respect to the original placement of the pallets on the transfer mechanism and with respect to the direction of travel of the transfer mechanism.

Another preferred implementation of the present process invention comprises the step of providing a section of the transfer mechanism with corner portion guide rails having a separation which is substantially greater than the width of the pallets, positioning a corner fairing to one of the guide rails to reduce the separation of the inner and outer guide rails to a value permitting the shorter lengthed pallets to maneuver around the corner portion without jamming, and selectively moving the corner fairing to permit longer lengthed pallets to maneuver around the corner portion without jamming.

Alternately described, the method of the present invention comprises the steps of placing pallets of different lengths having approximately equal widths on a moving transfer system, moving the pallets of different lengths toward a corner portion of the pallet transfer system, and guiding the pallets of different lengths through the corner portion of the pallet transfer system by use of an inner guide rail and an outer guide rail which prevent the pallets from substantially misaligning with respect to the original placement of the pallets on the transfer mechanism and with respect to the direction of travel of the transfer mechanism.

This version of the present method may be implemented in a variety of ways, including the further step of configuring the pallets so that the pallet configurations cooperate with the inner and outer guide rails, the further step comprising by way of example the step of truncating first and second corner portions of at least longer lengthed pallets for cooperating with a curved portion of the outer guide rail by reducing the turning radius of the longer lengthed pallets required at the transfer mechanism corner portion. By way of an alternate example, the present method may be implemented by the further step of providing at least the longer lengthed pallets with an arcuate surface in a portion of a pallet sidewall for cooperation with a curved portion of the inner guide rail or by providing such pallets with an arcuate surface in a portion of a pallet sidewall for cooperation with a curved portion of the outer guide rail.

Still another method of implementing the present process invention comprises the further steps of providing a section of the transfer mechanism corner portion guide rails with a separation that is substantially greater than the width of the pallets, selectively positioning a corner fairing to a guide rail to provide rail width separation with a value permitting the shorter lengthed pallets to maneuver around the corner portion without jamming, and selectively moving the corner fairing to permit longer lengthed pallets to maneuver around the corner portion without jamming.

As previously indicated, the present invention is preferably implemented to permit pallets to accumulate in the corner portion of the transfer mechanism as well as to maneuver around the corner portion of the transfer mechanism while maintaining the original orientation of the pallet with respect to the direction of pallet travel, with both the accumulation of the pallets in the corner portion and the transfer of the pallets around the corner portion occurring without jamming. Implementing the present system in this manner eliminates the need for metering the pallets at the corner portion. Thus, the prior art requirement to meter pallets at a corner portion in order to prevent accumulation of the pallets in the corner portion can be eliminated with the present system.

Note that, with the present invention, pallets of different lengths can be transferred through the system at the same time. Such a mixture of different lengthed pallets permits building devices being carried on the pallets to an order quantity of one.

The present invention is to be limited only in accordance with the scope of the appended claims, since persons skilled in the art may devise other embodiments still within the limits of the claims.

What is claimed:

1. A pallet transfer corner system, comprising:
a transfer mechanism having a rotating corner portion centered about an axis and guide rail means defining the path of pallets around said corner, including a curved inner guide rail having a radius of curvature of r and a curved outer guide rail having a radius of curvature of r plus d; and
pallets having an inner sidewall with an arcuate surface on a portion thereof configured to cooperate with said inner guide rail, said pallet also having an outer substantially straight sidewall cooperating with said outer curved guide rail such that the maximum distance from said axis to said outer sidewall does not exceed r plus d.

2. The system of claim 1, wherein said rotating corner includes a rotating, circular-shaped turntable having a center of rotation at said axis.

3. The system of claim 1, wherein said pallets comprise pallets of a nominal width W and different nominal lengths L and greater than L.

4. The system of claim 3, wherein said pallets comprise pallets with an outer sidewall having first and second truncated corners, whereby said distance r plus d is less than for rectangular pallets of the same length.

5. A pallet transfer corner system, comprising:
a transfer mechanism comprising a corner portion having a rotating, circular-shaped turntable with an axis of rotation, including guide rail means defining the path of pallets around said corner, including a curved inner guide rail having a radius of curvature of r and a curved outer guide rail having a radius of curvature of r plus d; and
pallets of a nominal width W and different nominal lengths L and greater than L having an inner sidewall having an arcuate surface configured to cooperate with said inner guide rail r, said pallet also having an outer sidewall with first and second truncated corners cooperating with said outer curved guide raid such that the maximum distance from said outer sidewall does not exceed r plus d, while maintaining the original orientation of the pallets with respect to the direction of pallet travel.

6. A pallet for use with a transfer corner system, having a transfer mechanism comprising a corner portion including guide rail means defining the path of pallets around said corner, with a curved inner guide rail having a radius of curvature of r and a curved outer guide rail having a radius of curvature of r plus d, comprising:
pallets having an inner sidewall with an arcuate surface on a portion thereof configured to cooperate with said inner guide rail, said pallet also having an outer substantially straight sidewall cooperating with said outer curved guide rail such that the maximum distance from said axis to said outer sidewall does not exceed r plus d.

7. The pallet of claim 6, wherein said rotating corner includes a rotating, circular-shaped turntable having a center of rotation at said axis.

8. The system of claim 6, wherein said pallets comprise pallets of a nominal width W and different nominal lengths L and greater than L.

9. The system of claim 8, wherein said pallets comprise pallets with an outer sidewall having first and second truncated corners, whereby said distance r plus d is less than for rectangular pallets of the same length.

* * * * *